US007198835B2

(12) United States Patent
Anderson

(10) Patent No.: US 7,198,835 B2
(45) Date of Patent: Apr. 3, 2007

(54) DOOR COVER WITH STORAGE POCKETS

(75) Inventor: Robynn Anderson, New York, NY (US)

(73) Assignee: The Betesh Group Holding Corp., New York, NY (US)

( * ) Notice: Subject to any disclaimer, the term of this patent is extended or adjusted under 35 U.S.C. 154(b) by 184 days.

(21) Appl. No.: 10/999,869

(22) Filed: Nov. 30, 2004

(65) Prior Publication Data

US 2006/0115620 A1    Jun. 1, 2006

(51) Int. Cl.
*B32B 3/06* (2006.01)

(52) U.S. Cl. .................. 428/100; 428/99; 428/131; 52/311.1; 150/154; 40/606.07

(58) Field of Classification Search ............ 428/99, 428/100, 131; 150/154; 52/311.1; 40/606.07
See application file for complete search history.

(56) References Cited

U.S. PATENT DOCUMENTS 5,123,223 A * 6/1992 Makarevich et al. ....... 52/311.1
5,485,694 A * 1/1996 Goad ......................... 40/661

* cited by examiner

*Primary Examiner*—Alexander S. Thomas
(74) *Attorney, Agent, or Firm*—Ezra Sutton, Esq.

(57) ABSTRACT

A decorative door covering for a door, the door having a first door side, a second door side, a top side and a bottom side. The decorative door covering includes a first cover panel having a first exterior side, a first interior side, a first top edge and a first bottom edge; the first interior side for covering the first door side; and a second cover panel having a second exterior side, a second interior side, a second top edge and a second bottom edge; the second interior side for covering the second door side. The decorative door covering also includes a connector strip for connecting each of the first and second top edges of the first and second cover panels, respectively, in order to allow the connector strip to be placed on the top side of the door in order to hang each of the first and second cover panels on the opposed first and second door sides of the door. The decorative door covering further includes attachment means in the form of hook and loop straps for attaching and securing each of the first and second bottom edges of the first and second cover panels, respectively, about the bottom side of the door in order for the hook and loop straps to position and place each of the first and second interior sides of the first and second cover panels, respectively, in contact with the first and second door sides of the door, respectively.

33 Claims, 10 Drawing Sheets

DOOR COVER WITH STORAGE POCKETS

FIELD OF THE INVENTION

The invention relates to a two-sided decorative door cover having storage pockets thereon. More particularly, the door cover includes decorative designs on each side of the door cover.

BACKGROUND OF THE INVENTION

Decoration of doors in homes or businesses using a single sided door cover for celebration of holidays, sporting events, groups, institutions, colleges or special events such as birthdays, anniversaries, graduations, bridal or baby showers, childbirth and school functions are well known in the art. Door coverings also may simply be used for decorative purposes unrelated to particular events or themes such as a painting (i.e., "Mona Lisa"), a photograph (i.e., a mountain or ocean view, a jungle scene, etc.) and the like.

The means of attachment of the single door covering to a door are varied, and such attachment and securement means include adhesive tape, double-sided tape, hook and loop fasteners, glue, staples, thumbtacks, screws, nails, holding devices (i.e., releaseable cover holders having elastic elements thereon), hooks and the like. When the door covering is removed, the attachment means often mar the door and leave unsightly tape or glue remnants, or when using staples, screws, thumbtacks, or nails leave holes that have penetrated the exterior surface of the door which often have to be repaired, painted or stained.

In addition to the aforementioned marring of the door, conventional decorative techniques require considerable time on the part of one or more persons to affix as well as remove the desired decorative door covering to the door. Further, when removal of the decorative door cover begins, much care and time must be expended to remove the door cover carefully so that the door cover can be saved for future use. Otherwise, the decorative door covering may be destroyed and not be useable again.

There remains a need for a two sided decorative door covering having both a decorative motif, as well as a utility and functionality aspect to its design. The decorative motif should include designs involving vacation-type themes, TV shows/movies/characters, artistic themes and the like which further accentuates the theme of the user's bedroom. Additionally, the utility aspect should include storage-type pockets for storing of shoes, books, clothing and the like thereon. Further, the decorative and two-sided door covering should be removably attached to a bottom side of the door such as by the use of hook and loop straps positioned at the bottom edges of the door covering.

DESCRIPTION OF THE PRIOR ART

Decorative door coverings, protective door coverings, and door shields having various designs, configurations, structures and materials of construction have been disclosed in the prior art. For example, U.S. Pat. No. 5,123,223 to MADAVEVICH et al. discloses a decorative door cover that covers only the face of the door. This door cover is comprised of a sheet covering all or a portion of the surface face of a door, and having linear elements or pockets for readily and releaseably holding the sheet to the door. The sheet may have visual elements such as objects or scenes thereon, as by pasting, gluing, printing or weaving, and may have a support permanently or detachably secured to the sheet, for supporting an object such as wreath. The sheet may have a hole in registry with for example, a handle, which extends through the hole. This prior art patent does not disclose or teach the structure, configuration and design of the two-sided decorative door covering having storage compartments thereon of the present invention.

U.S. Pat. No. 5,922,437 to BRYANT discloses an adjustable fitted cover which can be used to cover doors. The cover is comprised of a sheet of pliable material comprising a bag-like structure with an opening. The opening has a continuous edge which is folded and stitched to form a channel along the edge of the opening. A closure, such as a drawstring or elastic ribbon, is enclosed within the channel for securably adjusting the cover on the door. The material used may be of various colors, patterns, and textures so as to complement any decor. Additionally, the cover may be dimensioned and configured to accommodate various sizes and types of doors. The cover may also employ a hook and loop fastener system to allow the use of interchangeable displays. Furthermore, assorted sizes and shapes of covers may be grouped together for use as a coordinating kit. This prior art patent does not disclose or teach the structure, configuration and design of the two-sided decorative door covering having storage compartments thereon of the present invention.

U.S. Application No. 2003/0026940 to BULLOCK discloses a decorative door cover that can be made in a variety of sizes and themes to fit any door and provides an attractive, easy to use cover that is reusable. The reusable decorative door cover is composed of a sheet of material sized to cover the face of the door to be decorated and to extend onto or around the sides thereof. The sheet has punch-outs that allow the door cover to pass over deadbolts, door locks, doorknobs and door hinges without removing the door or the hardware of the door. Elastic edging extends across the top and the bottom edges of the decorative door cover, and pockets formed in the four corners of the sheet fit over the four corners of the door. The elasticized edging, pockets, and non-elasticized sides of the sheet securely hold the door cover in place. This prior art publication does not disclose or teach the structure, configuration and design of the two-sided decorative door covering having storage compartments thereon of the present invention.

U.S. Pat. Nos. 6,029,409; 5,255,727; 6,308,474; 5,351,733; 5,103,593; and 2,249,927 disclose protective door covers or shields which protect doors from being damaged due to the elements or normal wear and tear associated with such activities as moving furniture which mars only the shield and possibly the original door. These prior art patents do not disclose or teach the structure, configuration and design of the two-sided decorative door covering having storage compartments thereon of the present invention.

None of the aforementioned prior art patents teach or disclose a two-sided decorative door covering having storage compartments on its individual panels. Also, none teach hook and loop strips for securing the bottom section of each panel with each other at the bottom side of the door being covered.

Accordingly, it is an object of the present invention to provide a two-sided decorative door covering having one or more storage compartments mounted on each of the exterior panels of the door covering for storing shoes, books, articles of clothing, health and beauty products, paper work, jewelry and the like.

Another object of the present invention is to provide a two-sided decorative door covering that includes decorative panels which meet the aesthetic needs of home or business decor. The decorative motif may include designs involving outdoor scenes, vacation-type. scenes, paintings, artistic themes, sporting events and the like in order further accentuate the user's bedroom or home decor.

Another object of the present invention is to provide a two-sided decorative door covering having attachment and securement means that does not mar the door when securing the door covering to the door.

Another object of the present invention is to provide a two-sided decorative door covering that is easy to assemble to the door, made from washable materials, (i.e., plastic materials, fabric materials, coated (waterproof) pliable paper) and are easy to clean and are storable.

Another object of the present invention is to provide a two-sided decorative door covering having simple securement means in the form of hook and loop straps that are easily attached to and removable from the door, wherein the hook and loop straps (VELCRO™) are located at the bottom edges of each of the front and rear panel covers for the door being covered.

A further object of the present invention is to provide a two-sided decorative door covering that can be mass produced in an automated and economical manner and is readily affordable by the user.

SUMMARY OF THE INVENTION

In accordance with the present invention, there is provided a decorative door covering for a door, the door having a first door side, a second door side, a top side and a bottom side. The decorative door covering includes a first cover panel having a first exterior side, a first interior side, a first top edge and a first bottom edge; the first interior side for covering the first door side; and a second cover panel having a second exterior side, a second interior side, a second top edge and a second bottom edge; the second interior side for covering the second door side. The decorative door covering also includes a connector strip for connecting each of the first and second top edges of the first and second cover panels, respectively, in order to allow the connector strip to be placed on the top side of the door in order to hang each of the first and second cover panels on the opposed first and second door sides of the door. The decorative door covering further includes attachment means in the form of hook and loop straps for attaching and securing each of the first and second bottom edges of the first and second cover panels, respectively, about the bottom side of the door in order for the hook and loop straps to position and place each of the first and second interior sides of the first and second cover panels, respectively, in contact with the first and second door sides of the door, respectively.

BRIEF DESCRIPTION OF DRAWINGS

Further, objects, features and advantages of the present invention will become apparent upon the consideration of the following detailed description of the presently preferred embodiment when taken in conjunction with the accompanying drawings, wherein.

DETAILED DESCRIPTION OF THE PREFERRED EMBODIMENT

Figure 1:
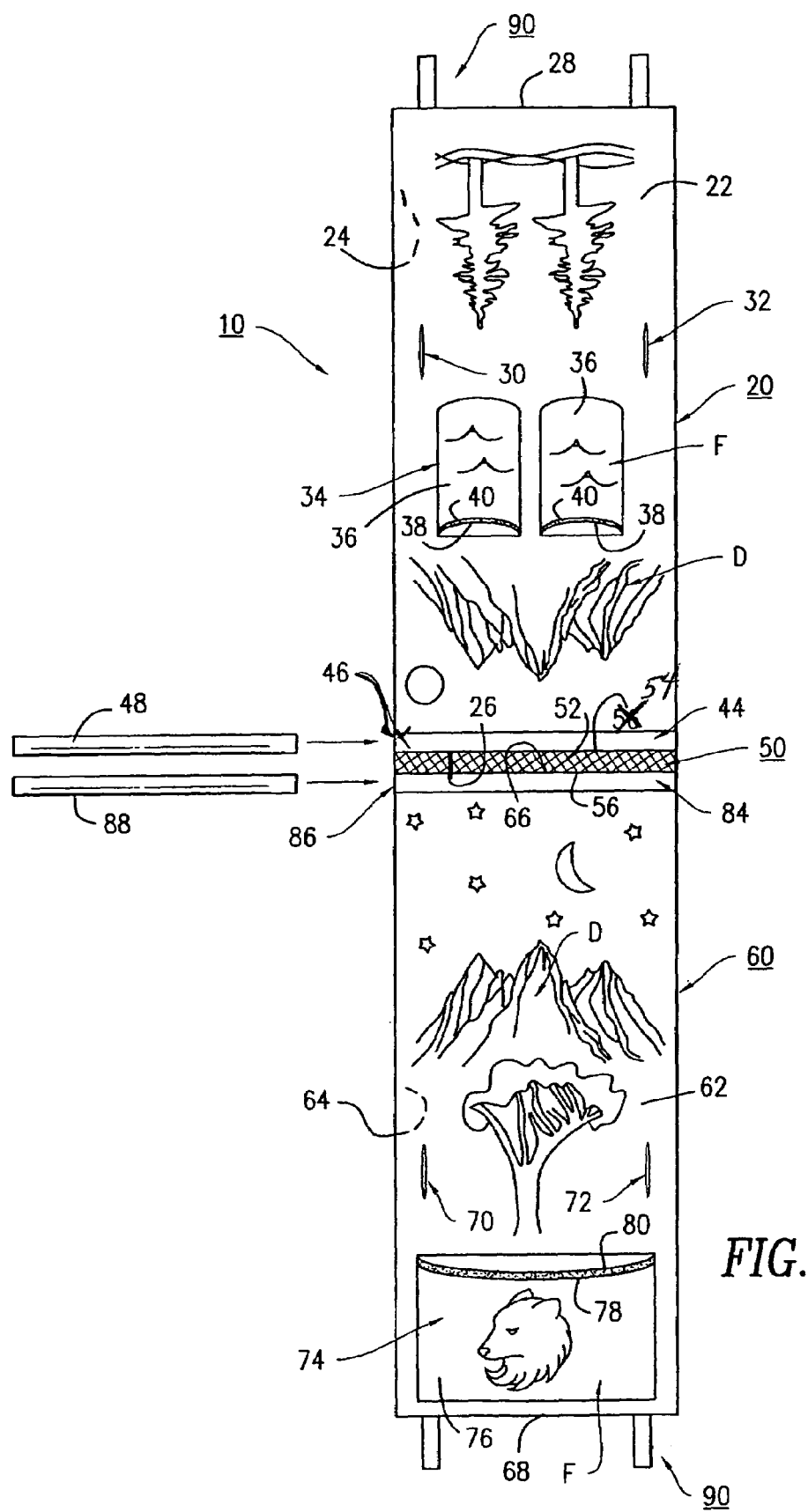
FIG. 1 is a top plan view of the decorative door covering of the preferred embodiment of the present invention showing the major component parts thereof.

The decorative door covering 10 and its component parts of the preferred embodiment of the present invention are represented in detail by FIGS. 1 through 8f of the patent drawings. The decorative door covering 10 is used to cover front and rear door sides 13f and 13r of a door 12 in order to meet the aesthetic needs of a home or business decor. The decorative door cover 10 includes a first cover panel 20, a connector strip member 50, a second cover panel 60 and door attachment means 90 and, as shown in FIGS. 1, 3 to 5 of the drawings.

The door 12 includes a first (front) doorside 13f, a second (rear) door side 13r, a top side 13t and a bottom side 13b. Each of the doorsides 13f and 13r also includes first and second door handles and/or door knobs 14h and 14k being fixedly attached thereto.

Figure 2:
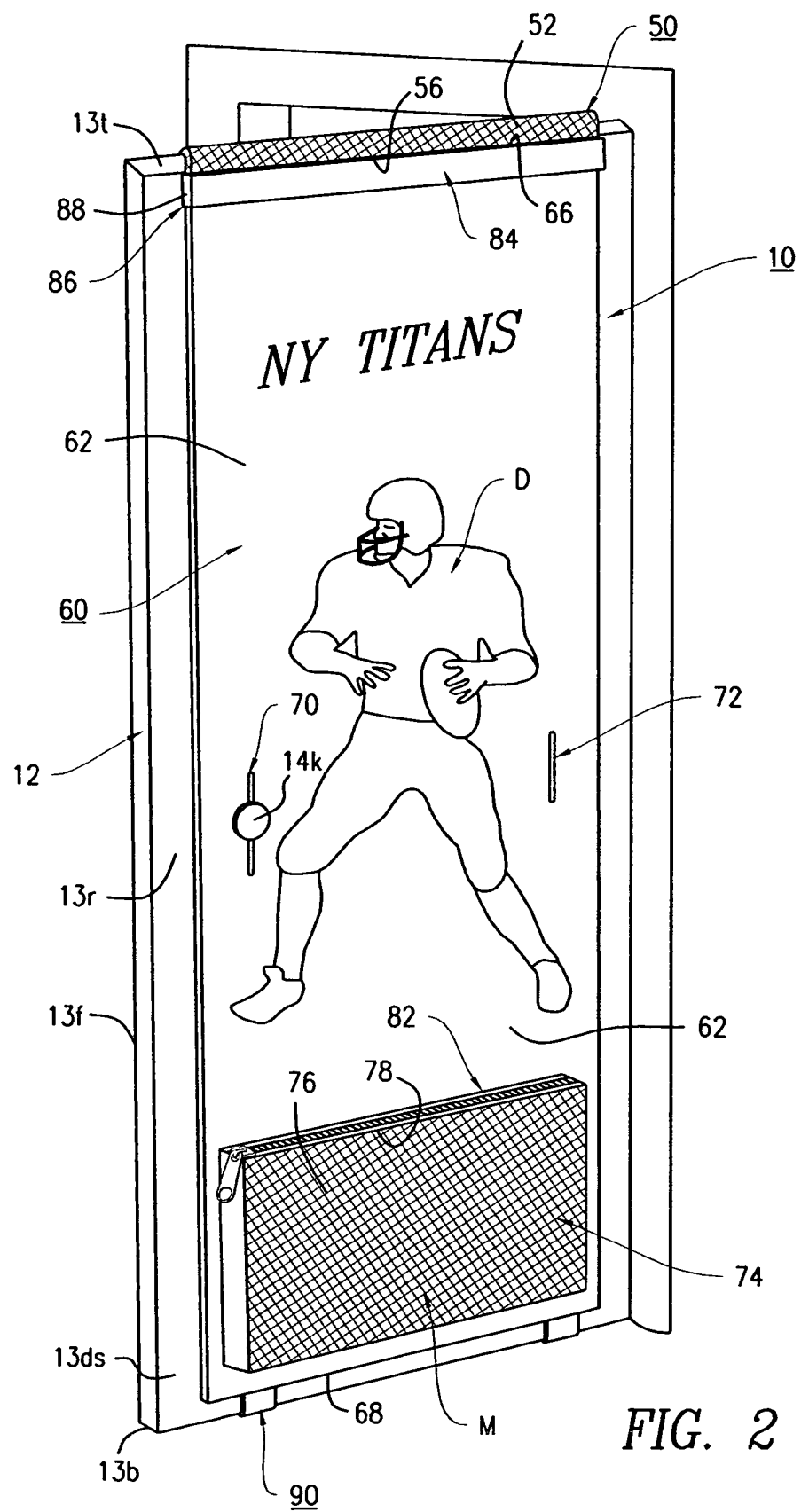
FIG. 2 is a perspective view of the decorative door covering of the present invention showing the door covering removably attached to a door in an assembled state and in operational use thereof.
Figure 3:
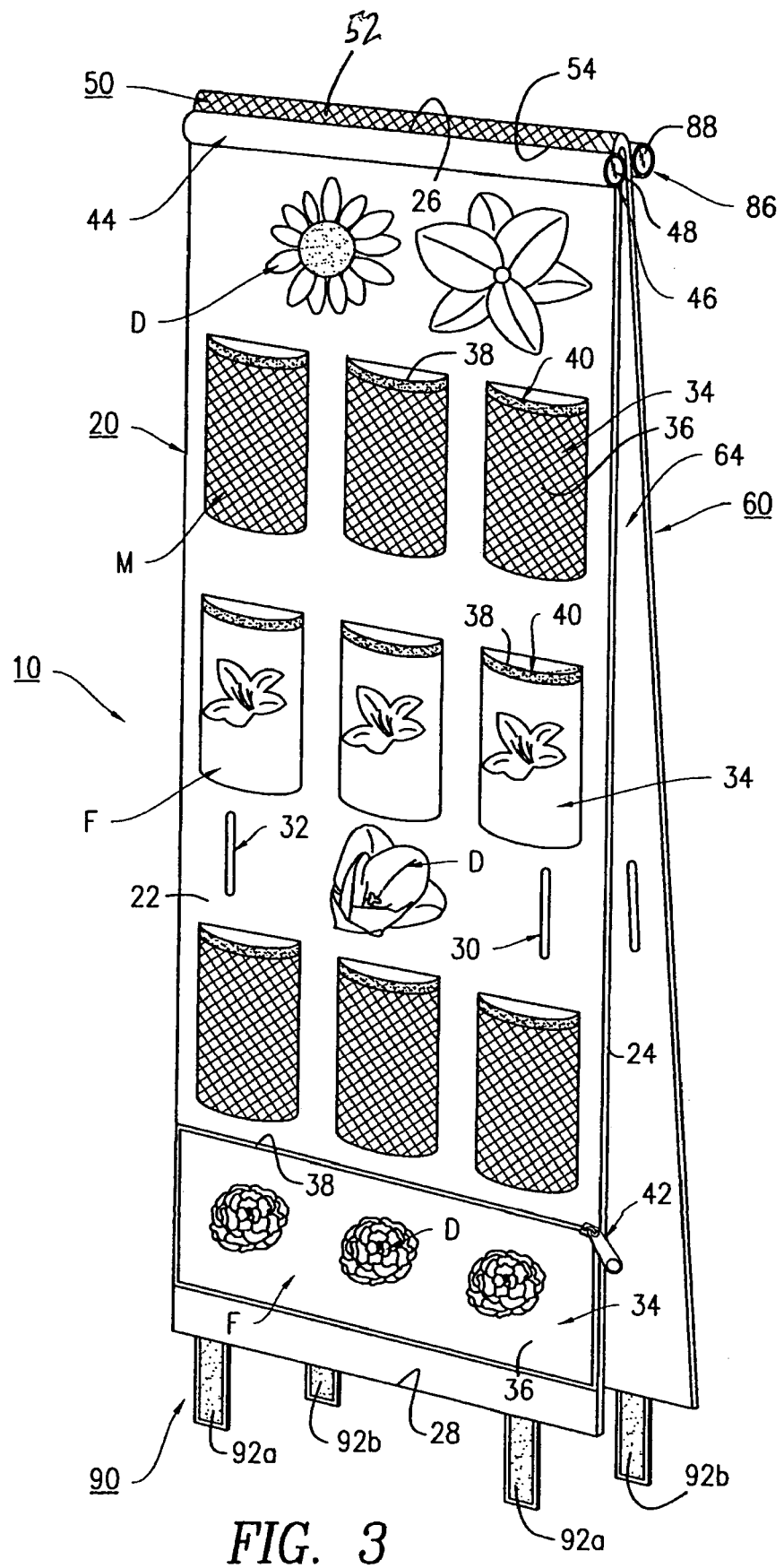
FIG. 3 is a perspective view of the decorative door covering of the present invention showing first and second cover panels, a connector strip, a pair of bottom sleeves each having a bottom rod member therein, a pair of hook and loop straps, and a plurality of storage compartments.
Figure 4:
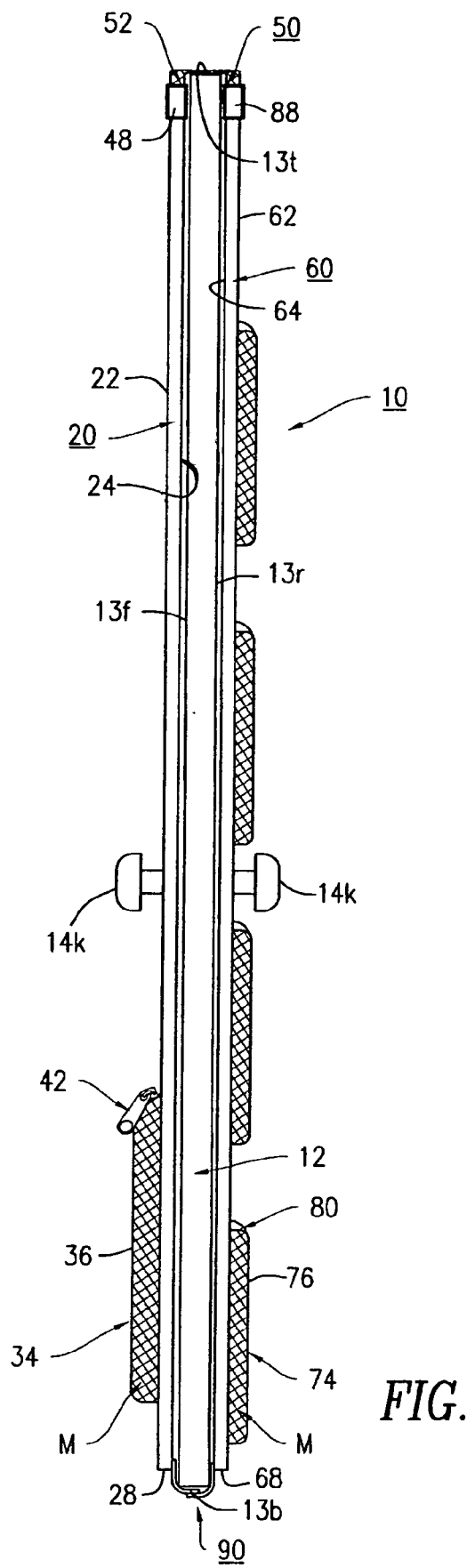
FIG. 4 is a side elevational view of the decorative door covering of the present invention showing the door covering seated on the door in an assembled state and in operational use thereof.

The decorative door covering 10 for the door 12, as depicted in FIGS. 1 to 4, includes a first cover panel 20 having a first exterior side 22, a first interior side 24, a first top edge 26 and a first bottom edge 28. The first interior side 24 is adjacent to and in contact with the first door side 13f of door 12 in order to allow the covering by the first cover panel 20 of the first door side 13f, as shown in FIGS. 2 to 4 of the drawings. The first cover panel 20 also includes one or more openings 30 and 32 for receiving the door handle 14*h* or the door knob 14*k* therethrough in order to allow an attachment of the first cover panel 20 to the front door side 13*f* of door 12. The first cover panel 20 further includes one or more storage compartments 34 being fixedly attached to the first exterior side 22 of first cover panel 20. Each of the storage compartments 34 includes a front cover 36 having an upper edge 38 with an elastic member 40 thereon or a zipper member 42 thereon for closing the front cover 36 relative to first exterior side 22 of first cover panel 20. The front cover 36 of storage compartment 34 can be made from a mesh material M or a fabric material F. The first exterior side 22 of first cover panel 20 also includes a preprinted decorative design D thereon. In addition, the first exterior side 22 of first cover panel 20 includes a batten sleeve 44 having a sleeve opening 46 for receiving a batten rod member 48 therein. The batten rod member 48 can be a plastic or wood bar (flat rectangularly-shaped cross-section); or a plastic or wood dowel/rod (circular cross-section) for use with the batten sleeve opening 46. The sleeve opening 46 is adjacent to the first top edge 26 of first cover panel 20, as shown in FIGS. 3 and 4 of the drawings.

The decorative door covering 10 for the door 12, as depicted in FIGS. 1 to 4, also includes a second cover panel 60 having a second exterior side 62, a second interior side 64, a second top edge 66 and a second bottom edge 68. The second interior side 64 is adjacent to and in contact with the second door side 13*r* of door 12 in order to allow the covering by the second cover panel 60 of the second door side 13*r*, as shown in FIGS. 2 to 4 of the drawings. The second cover panel 60 also includes one or more openings 70 and 72 for receiving the door handle 14*h* or the door knob 14*k* therethrough in order to allow an attachment of the second cover panel 60 to the rear door side 13*r* of door 12. The second cover panel 60 further includes one or more storage compartments 74 being fixedly attached to the second exterior side 62 of second cover panel 60. Each of the storage compartments 74 includes a front cover 76 having an upper edge 78 with an elastic member 80 thereon or a zipper member 82 thereon for closing the front cover 76 relative to the second exterior side 62 of second cover panel 60. The front cover 76 of storage compartment 74 can be made from a mesh material M or a fabric material F. The second exterior side 62 of second cover panel 60 also includes a preprinted decorative design D thereon. In addition, the second exterior side 62 of second cover panel 60 includes a batten sleeve 84 having a sleeve opening 86 for receiving a batten rod member 88 therein. The batten rod member 88 can be a plastic or wood bar (flat rectangularly-shaped cross-section); or a plastic or wood dowel/rod (circular cross-section) for use with the batten sleeve opening 86. The sleeve opening 86 is adjacent to the second top edge 66 of second cover panel 60, as shown in FIGS. 3 and 4 of the drawing.

Figure 6:
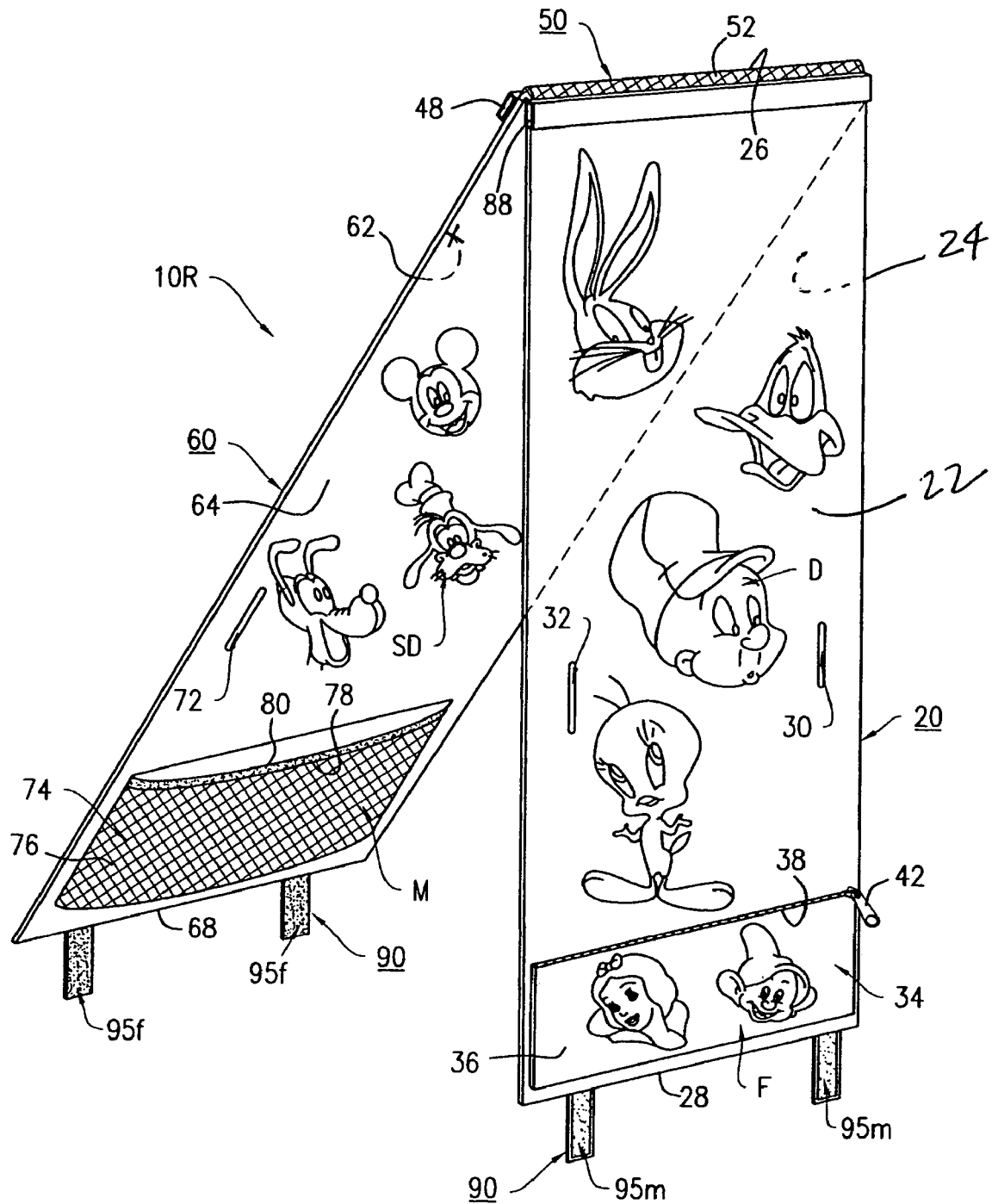
FIG. 6 is a perspective view of the decorative door covering of the present invention showing a two-sided and reversible decorative door covering.

It is understood that the first and second interior sides 24 and 64 of first and second cover panels 20 and 60 can also include storage compartments 34 and 74 thereon, as depicted in FIG. 6, as well as having a second preprinted decorative design SD thereon for forming a reversible decorative door covering 10R.

The first and second cover panels 20 and 60 are made from materials selected from the group consisting of polyester, cotton, nylon, rayon, flexible plastic sheets, paper, cardboard and combinations thereof.

The connector strip member 50, as shown in FIGS. 1, 2 and 4, includes a center mesh strip 52 having a first strip edge 54 and a second strip edge 56. The first and second strip edges 54 and 56 of center mesh strip 52 are integrally attached to each of the first and second top edges 26 and 66 of the first and second cover panels 20 and 60, respectively, in order to allow the connector strip member 50 to be placed on the top side 13*t* of the door 12 in order to hang each of the first and second cover panels 20 and 60 on the opposed first and second door sides 13*f* and 13*r* of door 12, respectively. The center mesh strip 52 is made from mesh materials.

As shown in FIGS. 1, 3 and 8*a* to 8*f*, the first and second cover panels 20 and 60 further include first attachment means 90 for attaching and securing each of the first and second bottom edges 28 and 68 of the first and second cover panels 20 and 60, respectively, about the bottom side 13*b* of the door 12. The first attachment means 90 operates to place each of the first and second interior sides 24 and 64 of the first and second cover panels 20 and 60 in contact with the first and second door sides 13*f* and 13*r* of the door 12, respectively. The attachment means 90 can be made of various structures, configurations and designs for the user's ease of attachment to the door 12. These first attachment means 90 may include any one of the following examples: a pair of hook and loop straps 91*h* and 91*l* (See FIG. 8*a*), a pair of removable self-adhesive straps 92*a* and 92*b* (See FIG. 8*b*), a pair of plastic snap buckle and sleeve straps 93*b* and 93*s* (See FIG. 8*c*), a pair of hook and eyelet elastic straps 94*h* and 94*e* (See FIG. 8*d*), a pair of elastic male and female snap straps 95*m* and 95*f* (See FIG. 8*e*), or a pair of tie strings 96*a* and 96*b* (See FIG. 8*f*).

Figure 5:
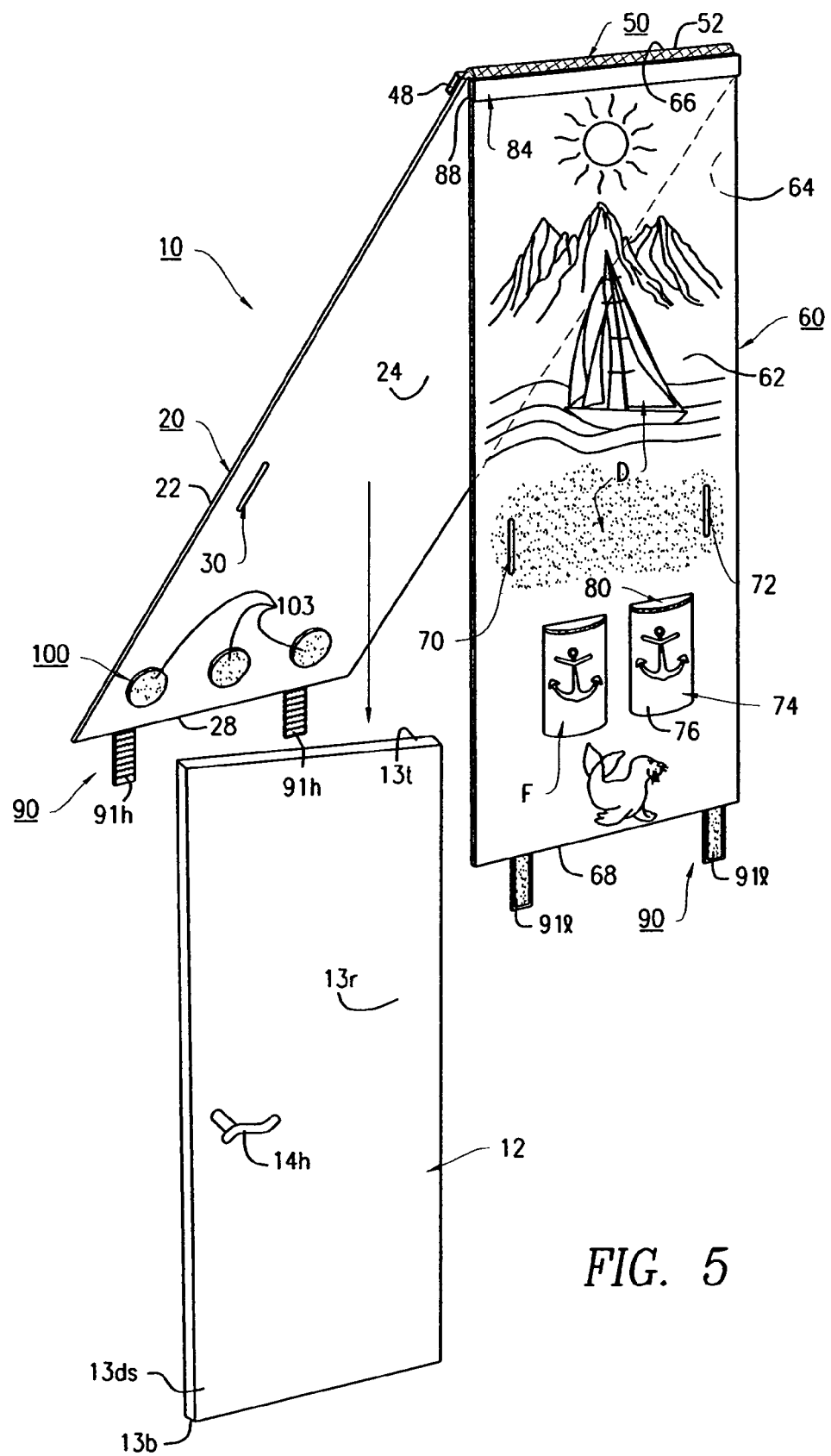
FIG. 5 is an exploded perspective view of the decorative door covering of the present invention showing the door covering being positioned on the door being readied for operational use thereof.

As shown in FIGS. 3, 4 and 5, the first and second interior sides 24 and 64 of the first and second cover panels 20 and 60, respectively, further include second attachment means for attaching and securing each of the first and second interior sides 24 and 64 of the first and second cover panels 20 and 60, respectively, to the bottom door section 13*ds* of door 12 in order for the second attachment means to place each of the first and second interior sides 26 and 64 of the first and second cover panels 20 and 60, respectively, in contact with the first and second door sides 13*f* and 13*r* of the door 12, respectively. These second attachment means may include any one of the following examples: one or more removable self-adhesive strips, one or more removable double-sided adhesive strips and one or more removable glue patches. It is understood that second attachment means can be used in addition to the first attachment means 90, or as an alternative attachment means instead of the first attachment means 90. In another embodiment, no attachment means 90 or are used to secure the first and second cover panels 20 and 60 to the front and rear door sides 13*f* and 13*r* of door 12, respectively.

OPERATION OF THE PRESENT INVENTION

In operation, as depicted in FIGS. 1, 2, 4, 5, 7 and 8*a* to 8*f* of the drawings, the decorative door covering 10 operates in the following manner. Referring to FIG. 1, when the door covering 10 is laid out in a flat position the user inserts each of the batten wood members 48 and 88 into the sleeve openings 46 and 86 of batten sleeves 44 and 84 being adjacent to the first and second top edges 26 and 66 of first and second cover panels 20 and 60, respectively. The batten rod members 48 and 88 give rigidity to each of the cover panels 20 and 60 for ease of placement of the door covering 10 on door 12.

In the next step the user now places the connector strip member 50 along the length of the top side 13*t* of door 12, as shown in FIG. 5, allowing the door covering 10 to hang each of the first and second cover panels 20 and 60 on the opposed first and second door sides 13f and 13r of door 12. In the next assembling step, as shown in FIGS. 2, 4 and 5, the user now attaches the door handles 14h or door knobs 14k through appropriate door openings 30 or 32 and 70 or 72 on cover panels 20 and 60 for allowing the attachment of the first and second cover panels 20 and 60 to the front and rear door sides 13f and 13r, respectively, of door 12 in a detachably connected manner.

In the last assembly step, as depicted in FIGS. 2, 4 and 8a to 8f, the user then attaches and secures each of the first and second bottom edges 28 and 68 of the first and second cover panels 20 and 60 using a first attachment means 90, respectively, about the bottom side 13b of door 12 in order for the first attachment means 90 to place and affix each of the first and second interior sides 24 and 64 of the cover panels 20 and 60 in contact with the front and rear door sides 13f and 13r of door 12, respectively. Various types of first attachment means 90 can be used to secure the decorative door covering 10 to door 12, such as a pair of hook and loop straps 91h and 91l (See FIG. 8a), a pair of removable self-adhesive straps 92a and 92b (See FIG. 8b), a pair of plastic snap buckle and sleeve straps 93b and 93s (See FIG. 8c), a pair of hook and eyelet elastic straps 94h and 94e (See FIG. 8d), a pair of elastic male and female snap straps 95m and 95f (See FIG. 8e), or a pair of tie strings 96a and 96b (See FIG. 8f).

Optionally, in a last assembly step, as shown in FIGS. 3, 4 and 5, the user then attaches and secures each of the first and second interior sides 24 and 64 of the first and second cover panels 20 and 60 using an alternate (second) attachment means, respectively, to the bottom (lower) door sides 13ds of door 12 in order for the second attachment means to place and affix each of the first and second interior sides 24 and 64 of the cover panels 20 and 60 in contact with the front and rear door sides 13f and 13r of door 12, respectively. Various types of second attachment means can be used to secure the decorative door covering 10 to door 12, such as one or more removable self-adhesive strips, one or more removable double-sided adhesive strips, and one or more removable glue patches.

Figure 7:
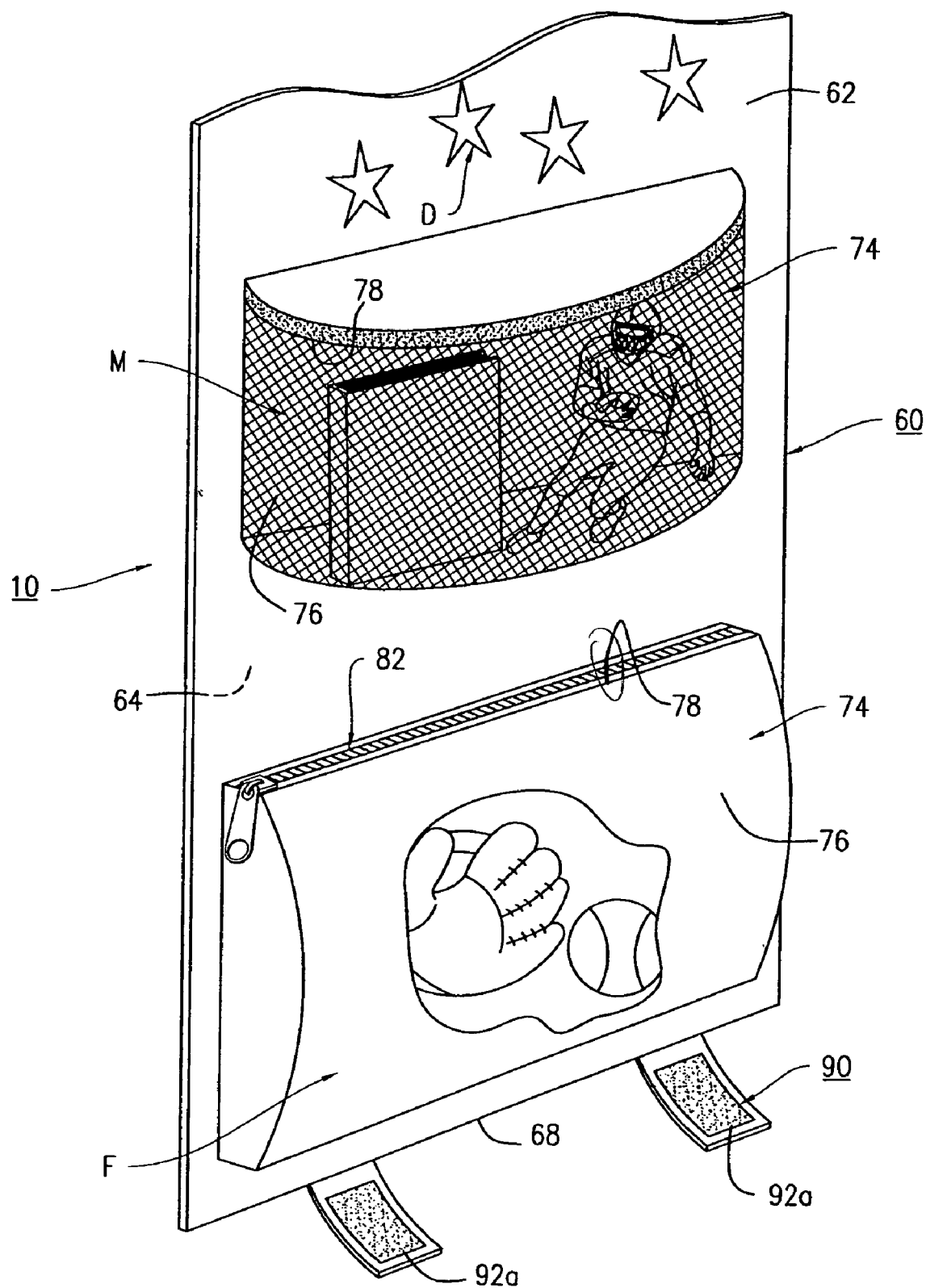
FIG. 7 is a perspective view of the decorative door covering of the present invention showing a pair of storage compartments each having means for closing thereon.
Figure 8A:
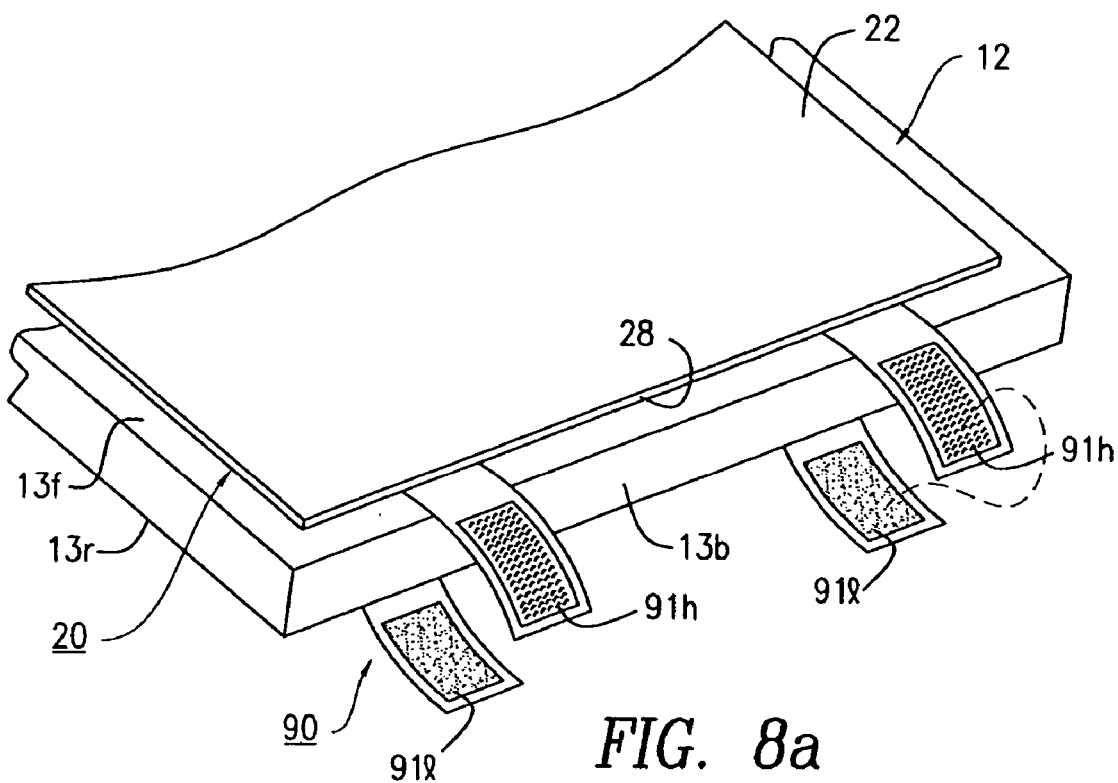
FIG. 8a is an enlarged perspective view of the decorative door covering of the present invention showing attachment and securement means in the form of hook and loop straps.
Figure 8B:
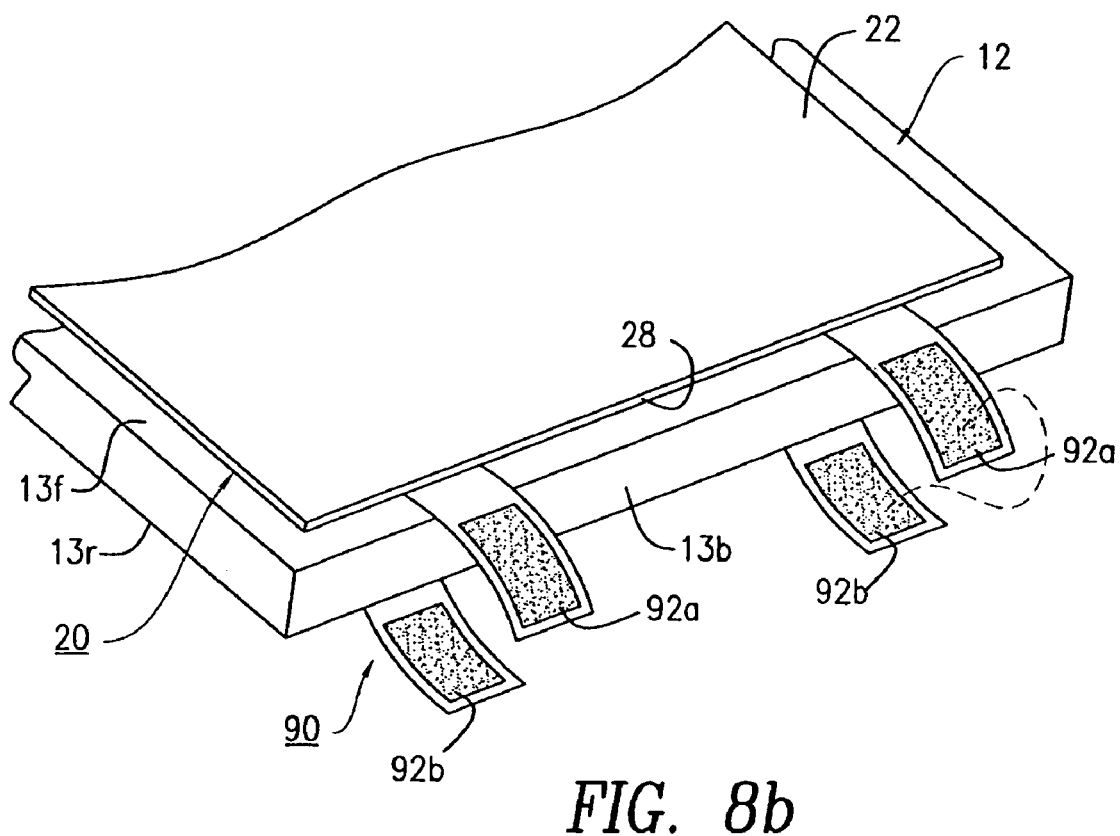
FIG. 8b is an enlarged perspective view of the decorative door covering of the present invention showing attachment and securement means in the form of removable self-adhesive straps.
Figure 8C:
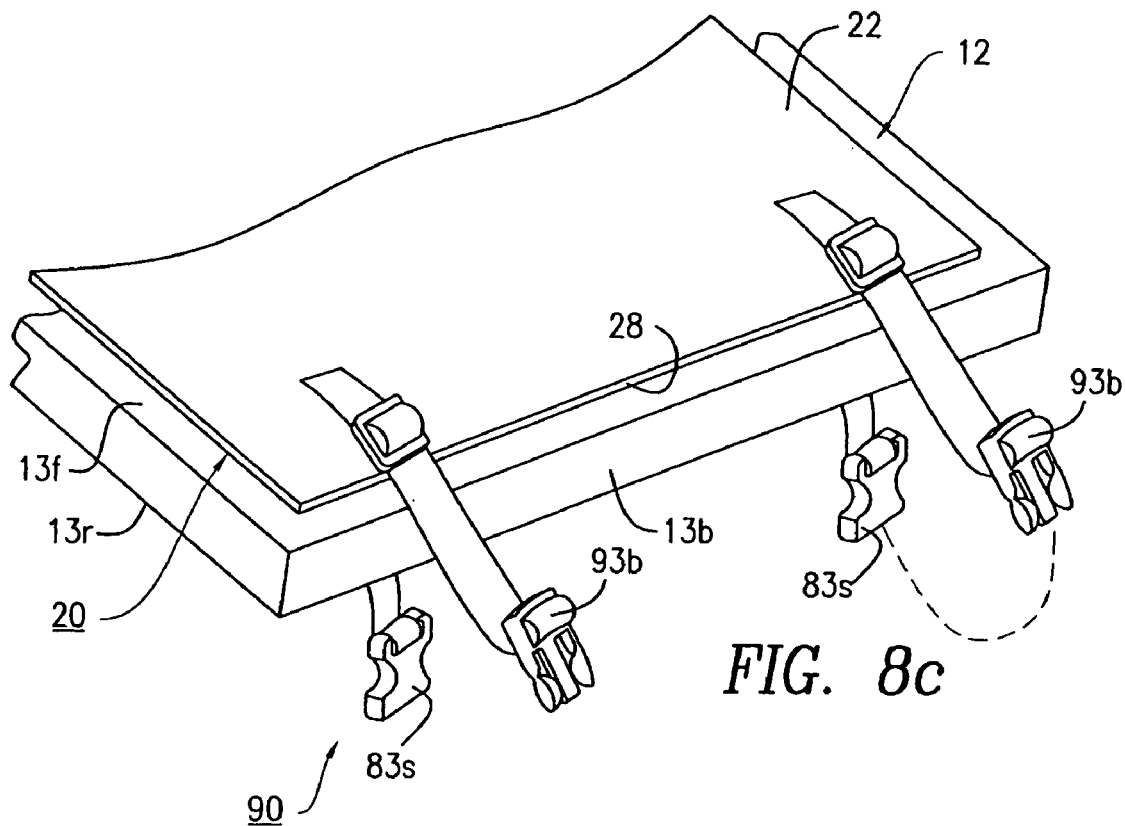
FIG. 8c is an enlarged perspective view of the decorative door covering of the present invention showing attachment and securement means in the form of buckle and sleeve straps.
Figure 8D:
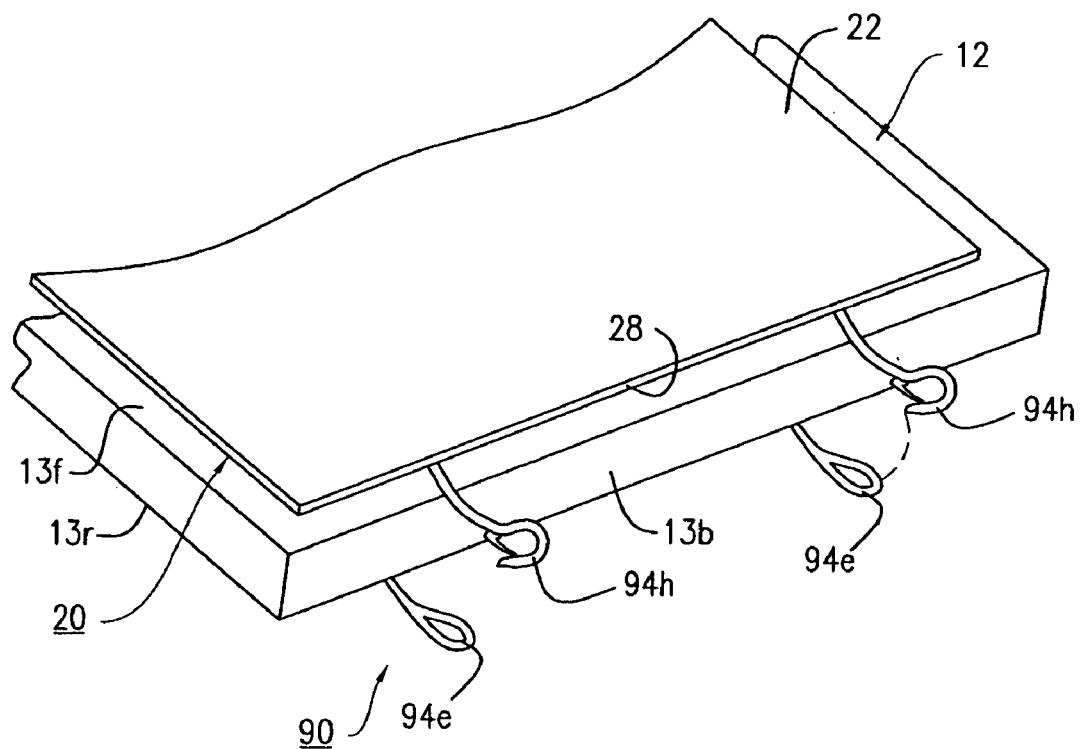
FIG. 8d is an enlarged perspective view of the decorative door covering of the present invention showing attachment and securement means in the form of hook and eyelet straps.
Figure 8E:
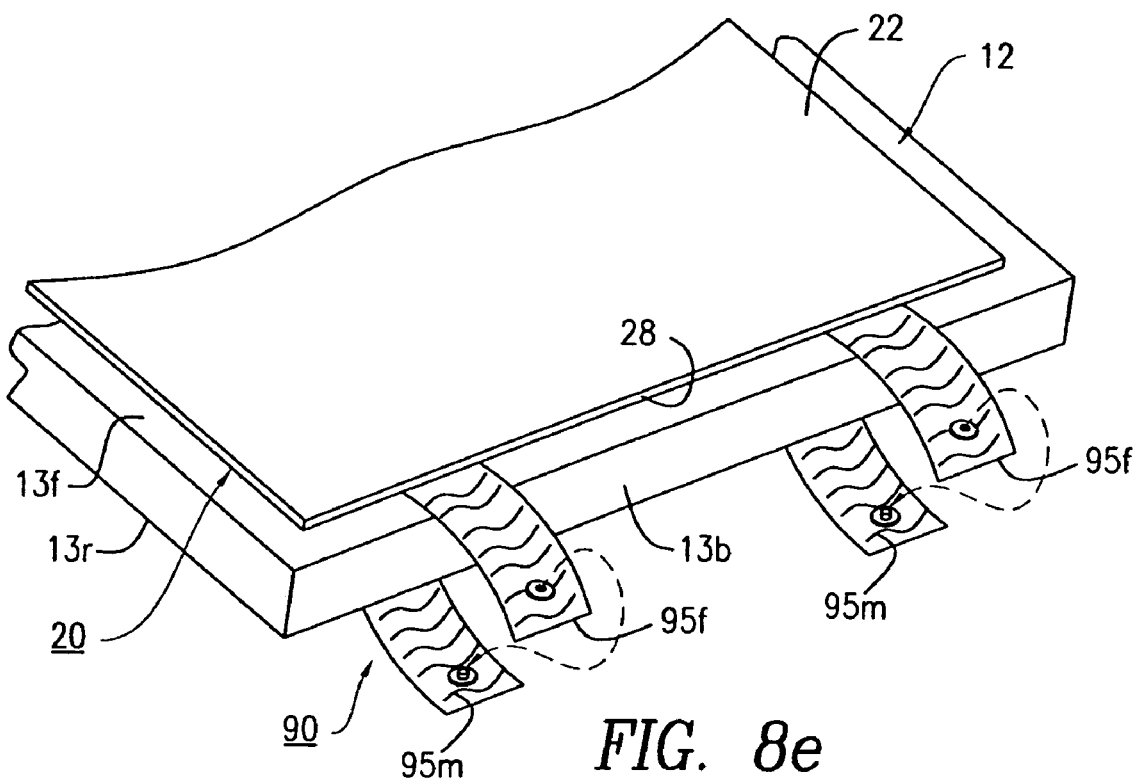
FIG. 8e is an enlarged perspective view of the decorative door covering of the present invention showing attachment and securement means in the form of elastic straps with male and female snaps.
Figure 8F:
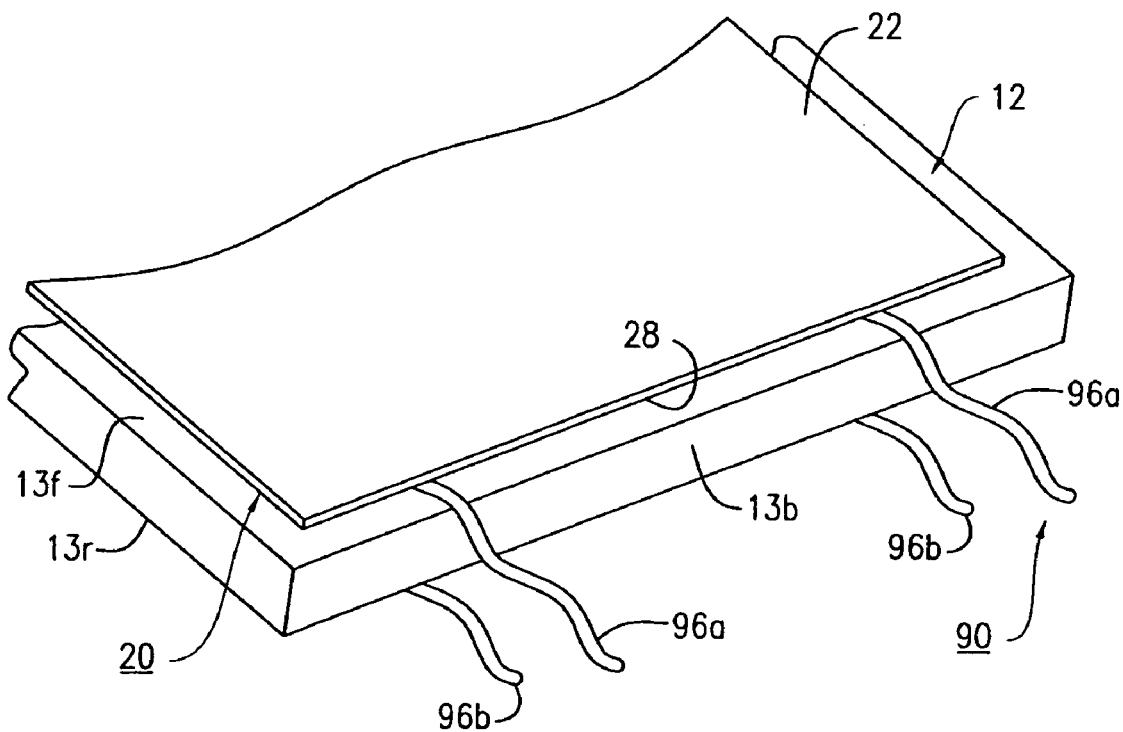
FIG. 8f is an enlarged perspective view of the decorative door covering of the present invention showing attachment and securement means in the form of string ties.

When in operational use, as shown in FIGS. 2 and 7, the user can store various personal items, such as books, toys, sports equipment, health and beauty aids and the like, within each of the storage compartments 34 and 74 on cover panels 20 and 60.

When using the reversible decorative door covering 10R, as depicted in FIG. 6, the user would simply flip the door covering 10R in a reverse configuration placing the interior sides 24 and 64 of cover panels 20 and 60 in an exterior configuration. The user would then repeat the aforementioned attachment steps for covering door 12 with reversible decorative door covering 10R.

ADVANTAGES OF THE PRESENT INVENTION

Accordingly, an advantage of the present invention is that it provides for a two-sided decorative door covering having one or more storage compartments mounted on each of the exterior panels of the door covering for storing shoes, books, articles of clothing, health and beauty products, paper work, jewelry and the like.

Another advantage of the present invention is that it provides for a two-sided decorative door covering that includes decorative panels which meet the aesthetic needs of home or business decor. The decorative motif may include designs involving outdoor scenes, vacation-type scenes, paintings, artistic themes, sporting events and the like in order further accentuate the user's bedroom or home decor.

Another advantage of the present invention is that it provides for a two-sided decorative door covering having attachment and securement means that does not mar the door when securing the door covering to the door.

Another advantage of the present invention is that it provides for a two-sided decorative door covering that is easy to assemble to the door, made from washable materials, (i.e., plastic materials, fabric materials, coated (waterproof) pliable paper), easy to clean and storable.

Another advantage of the present invention is that it provides for a two-sided decorative door covering having simple securement means in the form of hook and loop straps that are easily attached to and removable from the door, wherein the hook and loop straps (VELCRO™) are located at the bottom edges of each of the front and rear panel covering for the door being covered.

A further advantage of the present invention is that it provides for a two-sided decorative door covering that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A decorative door covering for a door, the door having a first door side, a second door side, a top side, a bottom side and a bottom door section, comprising:
    a) a first cover panel having a first exterior side, a first interior side, a first top edge and a first bottom edge; said first interior side for covering the first door side;
    b) a second cover panel having a second exterior side, a second interior side, a second top edge and a second bottom edge; said second interior side for covering the second door side;
    c) a connector strip for connecting each of said first and second top edges of said first and second cover panels, respectively, in order to allow said connector strip to be placed on the top side of the door in order to hang each of said first and second cover panels on the opposed first and second door sides of the door; and wherein said connector strip is made from a mesh material; and
    d) first attachment means for attaching and securing each of said first and second bottom edges of said first and second cover panels, respectively, about the bottom side of the door in order for said attachment means to place each of said first and second interior sides of said first and second cover panels, respectively, in contact with the first and second door sides of the door, respectively.

2. A decorative door covering in accordance with claim 1, wherein each of said first and second cover panels includes one or more openings for receiving a door handle or a door knob therethrough in order to allow an attachment of each of said first and second cover panels to be made to the door.

3. A decorative door covering in accordance with claim 1, wherein at least one of said first and second exterior sides include a preprinted decorative design thereon.

4. A decorative door covering in accordance with claim 3, wherein each of said first and second exterior sides include a preprinted decorative design thereon and each of said first and second interior sides include a preprinted decorative design thereon on said decorative door covering for providing a reversible decorative door covering.

5. A decorative door covering in accordance with claim 1, wherein each of said first and second cover panels are made from materials selected from the group consisting of polyester, cotton, nylon, rayon, flexible plastic sheets, paper, cardboard and combinations thereof.

6. A decorative door covering in accordance with claim 1, wherein said first attachment means include hook and loop fastener straps.

7. A decorative door covering in accordance with claim 1, wherein said first attachment means include elastic straps having male and female snaps thereon.

8. A decorative door covering in accordance with claim 1, wherein said first attachment means include straps having a buckle and sleeve strap thereon.

9. A decorative door covering in accordance with claim 1, wherein said first attachment means include string ties.

10. A decorative door covering in accordance with claim 1, wherein said first attachment means include removable self-adhesive straps.

11. A decorative door covering in accordance with claim 1, wherein said first attachment means include straps having a button and button openings thereon.

12. A decorative door covering in accordance with claim 1, wherein at least one of said first and second exterior sides of said first and second cover panels include one or more storage compartments thereon.

13. A decorative door covering in accordance with claim 12, wherein at least one of said storage compartments includes a front cover with an upper edge having an elastic member thereon for closing said storage compartment relative to said first and/or second exterior sides of said first and/or second cover panels, respectively.

14. A decorative door covering in accordance with claim 12, wherein at least one of said storage compartments includes a front cover with an upper edge having a zipper member thereon for closing said storage compartment relative to said first and/or second exterior sides of said first and/or second cover panels, respectively.

15. A decorative door covering in accordance with claim 1, wherein each of said first and second exterior sides of said first and second cover panels include one or more storage compartments thereon.

16. A decorative door covering in accordance with claim 15, wherein said front cover of said storage compartment is made from a mesh material.

17. A decorative door covering in accordance with claim 15, wherein said front cover of said storage compartment is made from a fabric material.

18. A decorative door covering in accordance with claim 1, wherein each of said first and second exterior sides of said first and second cover panels includes a batten sleeve having a sleeve opening for receiving a batten rod member therein; each of said batten sleeve openings being adjacent to each of said first and second top edges of said first and second cover panels, respectively.

19. A decorative door covering in accordance with claim 1, further including second attachment means for attaching and securing each of said first and second interior sides of said first and second cover panels, respectively, to the bottom door section of the door in order for said second attachment means to place each of said first and second interior sides of said first and second cover panels, respectively, in contact with the first and second door sides of the door, respectively.

20. A decorative door covering in accordance with claim 19, wherein said second attachment means include one or more removable self-adhesive strips.

21. A decorative door covering in accordance with claim 19, wherein said second attachment means include one or more removable double-sided adhesive strips.

22. A decorative door covering in accordance with claim 19, wherein said second attachment means include one or more removable glue patches.

23. A decorative door covering for a door, the door having a first door side, a second door side, a top side and a bottom side, comprising:
 a) a first cover panel having a first exterior side, a first interior side, a first top edge and a first bottom edge; said first interior side for covering the first door side;
 b) a second cover panel having a second exterior side, a second interior side, a second top edge and a second bottom edge; said second interior side for covering the second door side;
 c) each of said first and second exterior sides of said first and second cover panels includes a batten sleeve having a sleeve opening for receiving a batten rod member therein; each of said batten sleeve openings being adjacent to each of said first and second top edges of said first and second cover panels, respectively; and
 d) a connector strip for connecting each of said first and second top edges of said first and second cover panels, respectively, in order to allow said connector strip to be placed on the top side of the door in order to hang each of said first and second cover panels on the opposed first and second door sides of the door.

24. A decorative door covering in accordance with claim 23, further including first attachment means for attaching and securing each of said first and second bottom edges of said first and second cover panels, respectively, about the bottom side of the door in order for said first attachment means to place each of said first and second interior sides of said first and second cover panels, respectively, in contact with the first and second door sides of the door, respectively.

25. A decorative door covering in accordance with claim 24, wherein said first attachment means include hook and loop straps, snap buckle and sleeve straps, hook and eyelet elastic straps, removable self-adhesive straps, elastic male and female snap straps, button straps or tie strings.

26. A decorative door covering in accordance with claim 23, further including second attachment means for attaching and securing each of said first and second interior sides of said first and second cover panels, respectively, to the bottom door section of the door in order for said second attachment means to place each of said first and second interior sides of said first and second cover panels, respectively, in contact with the first and second door sides of the door, respectively.

27. A decorative door covering in accordance with claim 26, wherein said second attachment means include one or more removable self-adhesive strips, one or more removable double-sided adhesive tape strips, and one or more removable glue patches.

28. A decorative door covering in accordance with claim 23, wherein each of said first and second cover panels includes one or more openings for receiving a door handle or a door knob therethrough in order to allow an attachment of each of said first and second cover panels to be made to the door.

29. A decorative door covering in accordance with claim 23, wherein at least one of said first and second exterior sides include a preprinted decorative design thereon.

30. A decorative door covering in accordance with claim 29, wherein each of said first and second exterior sides include a preprinted decorative design thereon and each of said first and second interior sides include a preprinted decorative design thereon on said decorative door covering for providing a reversible decorative door covering.

31. A decorative door covering in accordance with claim 23, wherein each of said first and second cover panels are made from materials selected from the group consisting of polyester, cotton, nylon, rayon, flexible plastic sheets, paper, cardboard and combinations thereof.

32. A decorative door covering in accordance with claim 23, wherein at least one of said first and second exterior sides of said first and second cover panels include one or more storage compartments thereon.

33. A decorative door covering for a door, the door having a first door side, a second door side, a top side, a bottom side and a bottom door section, comprising:

a) a first cover panel having a first exterior side, a first interior side, a first top edge and a first bottom edge; said first interior side for covering the first door side;

b) a second cover panel having a second exterior side, a second interior side, a second top edge and a second bottom edge; said second interior side for covering the second door side;

c) each of said first and second exterior sides of said first and second cover panels includes a batten sleeve having a sleeve opening for receiving a batten rod member therein; each of said batten sleeve openings being adjacent to each of said first and second top edges of said first and second cover panels, respectively;

d) a connector strip for connecting each of said first and second top edges of said first and second cover panels, respectively, in order to allow said connector strip to be placed on the top side of the door in order to hang each of said first and second cover panels on the opposed first and second door sides of the door; and e) first attachment means for attaching and securing each of said first and second bottom edges of said first and second cover panels, respectively, about the bottom side of the door in order for said attachment means to place each of said first and second interior sides of said first and second cover panels, respectively, in contact with the first and second door sides of the door, respectively.

* * * * *